United States Patent Office 3,454,579
Patented July 8, 1969

3,454,579
IMIDAZO[1,5-a]QUINOLIN-1-ONE AND THIONE DERIVATIVES
William Blythe Wright, Jr., Woodcliff Lake, N.J., assignor to American Cyanamid Company, Stamford, Conn., a corporation of Maine
No Drawing. Continuation-in-part of application Ser. No. 528,354, Feb. 18, 1966. This application Aug. 17, 1967, Ser. No. 661,208
Int. Cl. C07d 57/04; A61k 27/00
U.S. Cl. 260—288                                10 Claims

ABSTRACT OF THE DISCLOSURE

The preparation of substituted amidazo[1,5-a]quinolin-1-one or thione compounds, intermediates and addition salts are described. These compounds are useful for their CNS depressant and tranquilizer properties.

This application is a continuation-in-part of application Ser. No. 528,354 filed Feb. 18, 1966, now abandoned.

SUMMARY OF THE INVENTION

This invention relates to new organic compounds. More particularly the invention relates to novel derivatives of imidazo[1,5-a]quinolin-1-one or thione, intermediates and addition salts thereof.

The novel compounds of this invention may be illustrated by the following general formula:

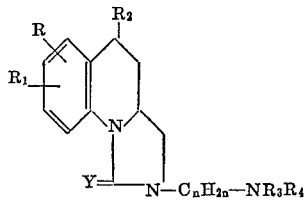

wherein R and $R_1$ are hydrogen, halogen, lower alkyl, lower alkoxy or trifluoromethyl; $R_2$ is hydrogen, lower alkyl or halogen; Y is oxygen or sulfur; $n$ is an integer 1, 2, 3, or 4; and $R_3$ and $R_4$ are hydrogen, lower alkyl, lower alkenyl, cycloalkyl, aralkyl, lower(cycloalkyl)methyl, and when —$NR_3R_4$ is taken together is 1-pyrrolidinyl, lower alkyl-1-pyrrolidinyl, piperidino, lower alkyl-piperidino, morpholino, lower alkylmorpholino, hexamethyleneimino, 1-piperazinyl, 1-(lower alkyl)-4-piperazinyl, 1-(hydroxy lower alkyl)-4-piperazinyl, 1-(lower alkanoyloxyalkyl)-4-piperazinyl, 1-phenyl-4-piperazinyl, 1-(lower alkoxyphenyl)-4-piperazinyl, 1-trifluoromethylphenyl-4-piperazinyl, 1 - (lower alkylphenyl) - 4 - piperazinyl, 1-halophenyl - 4 - piperazinyl, 4 - phenyl - 1,2,5,6 - tetrahydro-1 - pyridinyl, 4 - alkylphenyl - 1,2,5,6 - tetrahydro - 1-pyridinyl, 4 - halophenyl - 1,2,5,6 - tetrahydro - 1-pyridinyl, 4 - lower alkoxyphenyl - 1,2,5,6 - tetrahydro - 1-pyridinyl, 4 - trifluoromethylphenyl - 1,2,5,6 - tetrahydro-1 - pyridinyl and azabicyclo[3.2.2]-nonan-3-yl; and when —$C_nH_{2n}NR_3R_4$ is taken together are (2-pyrrolidinyl) lower alkyl, (3-pyrrolidinyl)lower alkyl, (1-lower alkyl-pyrrolidinyl)lower alkyl, (1 - benzylpyrrolidinyl)lower alkyl, [1-(halobenzyl)pyrrolidinyl]lower alkyl, [1-lower alkoxybenzyl)-pyrrolidinyl]lower alkyl, [1 - (lower alkylbenzyl)pyrrolidinyl]-lower alkyl, (piperidinyl)lower alkyl, (1-lower alkylpiperidinyl)-lower alkyl, (1-benzylpiperidinyl)lower alkyl, [1 - (halobenzyl) - piperidinyl]lower alkyl, [1 - (lower alkoxybenzyl)piperidinyl]-lower alkyl, [1 - (lower alkylbenzyl)piperidinyl]lower alkyl; and pharmaceutically acceptable acid addition salts thereof.

The free bases of this invention, in general, may be either liquids or solids at room temperature. The free bases are, in general, relatively insoluble in water, but soluble in most organic solvents such as lower alkyl alcohols and esters, acetone, chloroform, and the like. These compounds form addition salts with strong acids, such as hydrochloric acid, sulfuric acid, perchloric acid, and the like. The compounds also form salts with organic acids, as for example, fumaric and maleic acid. Such salts, in general, are soluble in water, methanol and ethanol, but relatively insoluble in benzene, ether, petroleum ether, and the like.

The compounds of the present invention possess central nervous system (CNS) activity at non-toxic doses and, as such are useful as highly active tranquilizers and CNS depressants. The compounds have been tested pharmacologically and found to have the above properties which show a desirable wide spread between doses producing depressant or sedative actions and toxic symptoms such as paralysis or lethality. They are also analgesics.

The CNS depressant properties, such as hypnotic and muscle relaxant type activity, are indicated by several procedures. For example, a test which indicates hypnotic and/or muscle relaxant type activity is represented by the following rod walking test. Groups of 6 mice each are tested for their ability to walk across a horizontal rod in a normal manner after receiving graded intraperitoneal doses of a test compound. A median effective dose, rod walking dose (RWD) is estimated.

A test which indicates tranquilizing activity is represented by a measure of the reduction in motor activity. One-half this dose is given to a group of 5 mice and a 5 minute count of motor activity is recorded (actophotometer). Counts of <250 are considered to indicate a specific reduction (more than two standard deviations) of activity at a dose causing only minimal impairment of neurological function as measured by rod walking ability. Compounds that appeared to reduce motor activity (<250 count) are administered to additional groups of 5 mice at graded doses and tested similarly. The motor depressant dose (MDD) which causes a 50% reduction of motor activity (a count of 250) is estimated. The use of reduced motor activity as a measure of tranquilizing activity has been described by W. D. Gray, A. C. Osterberg and C. E. Rauh, Archives Internationales et de Therapie, vol. 134, p. 198 (1961) and by W. J. Kinnard and C. J. Carr, Journal of Pharmacology and Experimental Therapeutics, vol. 121, p. 354 (1957).

The compounds of this invention also have been found to be active analgesics. The compounds are tested by a modification of the method described by E. Siegmund et al., Proc. Soc. Expt. Biol. Med., 95, 729 (1957). Briefly the test is described as follows: Two mice are administered the test compound, orally, 30 minutes prior to the intraperitoneal injection of 1 mg./kg. phenyl-p-quinone (PPQ). Fifteen minutes later the mice are observed for a period of 3 minutes and the total number of characteristic writhing episodes for both animals is counted and recorded. The mean number of writhes exhibited by 21 pairs of control animals (dosed orally with 2% starch) was 29. For our purposes, any compound that reduces the incidence of writhing to 18 or less is considered active in the (PPQ) test, otherwise the compound is rejected. The following Table 1 summarizes the results obtained using the above tests.

TABLE 1.—ACTIVITY OF REPRESENTATIVE COMPOUNDS OF THE PRESENT INVENTION

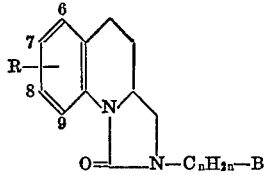

| R | B | n | Salt | CNS depressant MDD$_{50}$[1] | CNS depressant RWD$_{50}$[1] | Analgesic, 200 mg./kg. |
|---|---|---|---|---|---|---|
| H | CH$_3$NH— | 2 | HCl | 50 | 28 | |
| H | (CH$_3$)$_2$N— | 2 | Fumarate | 14 | 62 | A |
| H | CH$_3$(C$_2$H$_5$)N— | 2 | HCl | 7 | 26 | A |
| H | (C$_2$H$_5$)$_2$N— | 2 | Fumarate | 17 | 64 | A |
| H | Pyrrolidinyl | 2 | ...do... | 1.8 | 88 | A |
| 7-Cl | do | 2 | HCl | 9 | 58 | A |
| 8-Cl | do | 2 | HCl | 0.54 | 35 | A |
| 7-Br | do | 2 | HCl | 6.4 | 90 | A |
| 7-CH$_3$O | do | 2 | HCl | 2.9 | 20 | A |
| 8-CH$_3$ | do | 2 | Fumarate | 3.5 | 62 | A |
| 7,9-di Cl | do | 2 | HCl | 29 | 81 | A |
| H | Benzyl(methyl)N— | 2 | HCl | 3.6 | >100 | |
| 7-Cl | Benzyl(methyl)N— | 2 | HCl | 2.5 | >100 | A |
| 8-CH$_3$ | Benzyl(methyl)N— | 2 | HCl | 8.4 | 94 | A |
| H | Phenylpiperazinyl | 2 | HCl | 23 | 94 | A |
| H | (CH$_3$)$_2$N— | 3 | Fumarate | >50 | 100 | A |

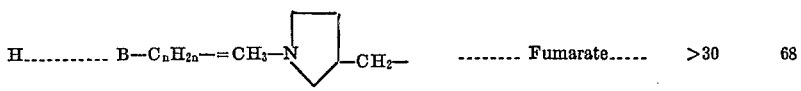

| | | | Fumarate | >30 | 68 | |

| | | | ...do... | 13 | 36 | A |

[1] In mg./kg.

The novel compounds of this invention may be preferably prepared by starting with substituted Reissert Compounds which have been described by F. D. Popp, W. Blount and P. Melvin, J. Org. Chem. 26, 4930 (1961). These are then converted to the intermediates such as 3,3a,4,5-tetrahydroimidazo[1,5-a]quinolin-1-one derivatives by methods similar to that described by H. Bidder and H Rupe, Helv. Chim. Acta 22, 1269 (1939).

The preferred method of preparing the compounds of the present invention can be illustrated as follows:

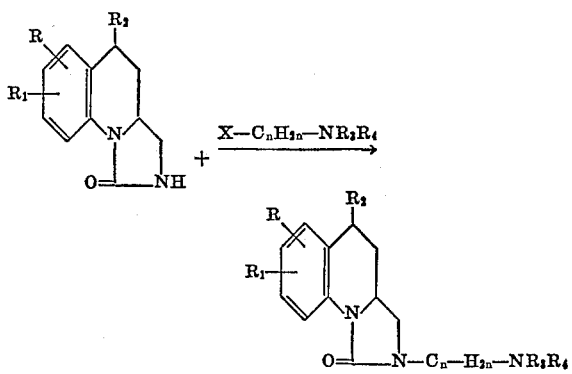

wherein R, R$_1$, R$_2$, R$_3$, R$_4$ and n are as defined hereinbefore and X is a reactive halogen, lower alkylsulfonyloxy or arylsulfonyloxy group. The imidazo[1,5-a]quinolin-1-one is dissolved in an inert solvent, as for example, diethyleneglycol dimethyl ether (diglyme) and reacted with a condensing agent such as sodium hydride and then with an appropriate aminoalkyl derivative. The reaction may be best carried out at temperatures within the range of about 30°–200° C. for a period of from 30 minutes to 8 hours. The product can be recovered by methods well known in the art and described hereinafter in the examples.

The novel compounds of the present invention may also be prepared by other methods, one of which is wherein a triamine precursor is reacted with a cyclizing agent, as for example, phosgene, ethyl chloroformate, N,N'-carbonyldiimidazole and the like to produce compounds having an oxygen in the 1-position. By using thiophosgene the corresponding compounds are produced wherein sulfur is present in the 1-position. These reactions may be illustrated as follows:

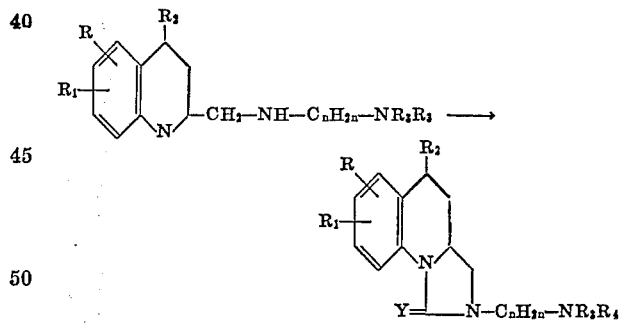

wherein R, R$_1$, R$_2$, R$_3$, R$_4$, Y, and n are as defined hereinbefore. The reaction takes place when the reagents are mixed in an inert solvent such as ether, tetrahydrofuran, benzene, toluene, and the like, and the mixture is gradually heated to a temperature within the range of 50°–200° C. for a period of time sufficient to complete the reaction.

The products of the present invention as CNS depressants and tranquilizers can be incorporated in various pharmaceutical forms such as tablets, capsules, pills, and so forth, for immediate or sustained release, by combining with carriers well known in the compounding arts. They may be in the form of dosage units for a single therapeutic dose or in small units for multiple dosages or in larger units for division into single doses. The effective therapeutic dose may range from 5 to 500 mg. in warm-blooded animals. Obviously, in addition to the therapeutic drug there may be present excipients, binders, fillers, and other therapeutically inert ingredients necessary in the formulation of the desired pharmaceutical preparation.

DETAILED DESCRIPTION

The following specific examples illustrate the preparation of the representative imidazo[1,5-a]quinolin-1-one or thione derivatives, intermediates of acid addition salts of the present invention. Parts are by weight unless otherwise indicated.

EXAMPLE 1

Preparation of 2-[2-(1-pyrrolidinyl)ethyl]-3,3a,4,5-tetrahydroimidazo[1,5-a]quinolin-1-(2H)-one A mixture of 1.6 parts of 50% sodium hydride (in mineral oil) and 5.6 parts of 3,3a,4,5-tetrahydroimadazo[1,5-a]-quinolin-1-(2H)-one in 150 parts of diglyme is stirred while 4.6 parts of 2-(1-pyrrolidinyl)ethyl chloride in 50 parts of dry ether are added. The reaction mixture is stirred for 30 minutes and then gradually heated for 4 hours as the ether is distilled off. The solid is filtered off and discarded and the mother liquor is concentrated to remove the solvent. Ether and 50 parts of 1 N hydrochloric acid are added to the residue. The mixture is shaken and the layers are separated. The aqueous layer is made alkaline with 5 N sodium hydroxide and the product is extracted into ether or benzene. The organic layer is mixed with a solution of 2.5 parts of fumaric acid in ethanol and a precipitate of the fumarate is formed. The precipitate is separated by filtration and recrystallized from ethanol. Pure 2[2-(1-pyrrolidinyl)ethyl] - 3,3a,4,5 - tetrahydroimidazo[1,5 - a]quinolin-1-(2H)-one fumarate melts at 163°–165° C.

EXAMPLE 2

Preparation of 2-(2-dimethylaminoethyl)-3,3a,4,5-tetrahydroimidazo[1,5-a]quinolin-1-(2H)-one The above compound, is obtained when 2-dimethylaminoethyl chloride is substituted for 2-(1-pyrrolidinyl) ethyl chloride in the procedure of Example 1. The corresponding fumarate salt melts at 151°–152° C.

EXAMPLE 3

Preparation of 2-[2-(2-methyl-1-pyrrolidinyl)ethyl]-3,3a,4,5-tetrahydroimidazo[1,5-a]quinolin-1-(2H)-one The above compound is obtained when 2-(2-methyl-1-pyrrolidinyl)ethyl chloride is substituted for 2-(1-pyrrolidinyl)ethyl chloride in the procedure of Example 1.

EXAMPLE 4

Preparation of 2-(4-piperidinobutyl)-3,3a,4,5-tetrahydroimidazo[1,5-a]quinolin-1-(2H)-one When 4-piperidinobutyl chloride is substituted for 2-(1-pyrrolidinyl)ethyl chloride in the method of Example 1, the above compound is obtained.

EXAMPLE 5

Preparation of 2-[2-(4-methylpiperidino)ethyl]-3,3a,4,5-tetrahydroimidazo[1,5-a]quinolin-1-(2H)-one This compound is obtained when 2-(4-methylpiperidino)-ethyl chloride is used in place of 2-(1-pyrrolidinyl) ethyl chloride in the procedure of Example 1.

EXAMPLE 6

Preparation of 2-(2-diethylaminoethyl)-3,3a,4,5-tetrahydroimidazo[1,5-a]quinolin-1-(2H)-one The above compound is obtained when 2-diethylaminoethyl chloride is substituted for 2-(1-pyrrolidinyl)ethyl chloride in the procedure of Example 1. The fumarate salt melts at 134–135° C.

EXAMPLE 7

Preparation of 8-chloro-2-[2-(1-pyrrolidinyl)ethyl]-3,3a,4,5-tetrahydroimidazo[1,5-a]quinolin-1-(2H)-one When 8 - chloro - 3,3a,4,5-tetrahydroimidazo[1,5-a] quinolin-1-(2H)-one is substituted for 3,3a,4,5-tetrahydroimidazo[1,5-a]-quinolin-1-(2H)-one in the procedure of Example 1 this compound is obtained. The hydrochloride salt melts at 214–216° C.

EXAMPLE 8

Preparation of 7-bromo-2-[2-(1-pyrrolidinyl)ethyl]-3,3a,4,5-tetrahydroimidazo[1,5-a]quinoline-1-(2H)-one The above compound is obtained when 7-bromo-3,3a,4,5-tetrahydroimidazo[1,5-a]quinolin-1-(2H)-one is substituted for 3,3a,4,5-tetrahydroimidazo[1,5-a]quinolin-1-(2H)-one in the procedure of Example 1. The hydrochloride salt melts at 249–251° C.

EXAMPLE 9

Preparation of 2-(2-dimethylaminoethyl)-7-methoxy-3,3a,4-5-tetrahydroimidazo[1,5-a]quinolin-1-(2H)-one When 2-dimethylaminoethyl chloride is reacted with 7-methoxy - 3,3a,4,5 - tetrahydroimidazo[1,5-a]quinolin-1-(2H)-one using the procedure of Example 1, the above compound is obtained.

EXAMPLE 10

Preparation of 2-(2-morpholinoethyl)-7-trifluoromethyl-3,3a,4,5-tetrahydroimidazo[1,5-a]quinolin-1-(2H)-one This compound is obtained when 2-morpholinoethyl chloride is reacted with 7-trifluoromethyl-3,3a,4,5-tetrahydroimidazo[1,5-a]quinolin-1-(2H)-one using the method of Example 1.

EXAMPLE 11

Preparation of 9 - chloro-2-(2-dimethylaminoethyl)-7-methyl - 3,3a,4,5 - tetrahydroimidazo[1,5-a]quinolin-1-(2H)-one When 9 - chloro - 7-methyl-3,3a,4,5-tetrahydroimidazo-[1,5-a]quinolin-1-(2H)-one is treated with 2-dimethylaminoethyl chloride, using the procedure of Example 1, this compound is obtained.

EXAMPLE 12

Preparation of 2 - [2-(2,6-dimethylmorpholino)ethyl]-7-fluoro - 3,3a,4,5 - tetrahydroimidazo[1,5-a]quinolin-1-(2H)-one If 2-(2,6-dimethylmorpholino)ethyl chloride is reacted with 7 - fluoro - 3,3a,4,5-tetrahydroimidazo[1,5-a]quinolin-1-(2H)-one using the procedure of Example 1, the above compound is obtained.

EXAMPLE 13

Preparation of 2 - (2-hexamethyleniminoethyl)-3,3a,4,5-tetrahydroimidazo[1,5-a]quinolin-1-(2H)-one When 2-hexamethyleniminoethyl chloride is substituted for 2-(1-pyrrolidinyl)ethyl chloride in the procedure of Example 1, this compound is obtained.

EXAMPLE 14

Preparation of 2 - [2 - (3-azabicyclo[3.2.2]nonan-3-yl) ethyl] - 3,3a,4,5 - tetrahydroimidazo[1,5-a]quinolin-1-(2H)-one This compound is obtained when 2-(3-azabicyclo-[3.2.2]-nonan-3-yl)ethyl chloride is substituted for 2-(1-pyrrolidinyl)ethyl chloride in the procedure of Example 1.

EXAMPLE 15

Preparation of 2-(2-methylphenethylaminoethyl)-3,3a,4,5-tetrahydroimidazo[1,5-a]quinolin-1-(2H)-one If 2-methylphenethylaminoethyl chloride is substituted for 2-(1-pyrrolidinyl)ethyl chloride in the procedure of Example 1, this compound is obtained.

EXAMPLE 16

Preparation of 2-(3-dimethylaminopropyl)-3,3a,4,5-tetrahydroimidazo[1,5-a]quinolin-1-(2H)-one This compound is obtained when 3-dimethylaminopropyl chloride is reacted with 3,3a,4,5-tetrahydroimidazo-[1,5-a]quinolin-1-(2H)-one by the procedure of Example 1. The fumarate salt has a melting point of 147–149° C.

EXAMPLE 17

Preparation of 2-[2-(4-phenyl-1-piperazinyl)ethyl]-3,3a, 4,5-tetrahydroimidazo[1,5-a]quinolin-1-(2H)-one The above compound is obtained when 2-(4-phenyl-1-piperazinyl)ethyl chloride is reacted with 3,3a,4,5-tetrahydroimidazo[1,5 - a]quinolin-1-(2H) - one by the procedure of Example 1. The hydrochloride salt melts at 251–252° C.

EXAMPLE 18

Preparation of 2-[3-(4-phenyl-1-piperazinyl)propyl]-3,3a, 4,5-tetrahydroimidazo[1,5-a]quinolin-1-(2H)-one A mixture of 5.6 parts of 3,3a,4,5-tetrahydroimidazo-[1,5-a]quinoline-1-(2H)-one and 1.6 parts of 50% sodium hydride (in mineral oil) in 100 parts of diglyme is stirred and a solution of 12 parts of 1,3-dibromopropane is added. The reaction mixture is stirred for 24 hours, the precipitated salt is filtered off, and the mother liquor is concentrated to remove the diglyme and excess 1,3-dibromopropane.

The crude 2 - (3 - bromopropyl) - 3,3a,4,5 - tetrahydroimidazo[1,5-a]quinolin-1-(2H)-one is mixed with 10 parts of 1-phenylpiperazine and 200 parts of benzene and heated at reflux temperature for 8 hours. The reaction mixture is extracted twice with aqueous sodium hydroxide solution and then with water. The aqueous layers are discarded. The reaction product is shaken with dilute hydrochloric acid and the benzene layer is discarded. Dilute sodium hydroxide is added and the product is dissolved in benzene or chloroform. On concentration, crude 2 - [3 - (4 - phenyl-1-piperazinyl)-propyl]-3,3a,4, 5 - tetrahydroimidazo[1,5-a]quinolin-1-(2H)-one is obtained. It is further purified by partition chromatography. The dihydrochloride salt melts at 230–232° C. after recrystallization from ethanol.

In the above procedure by substituting 1 - (p-chlorophenyl)piperazine, 1 - (m - trifluoromethylphenyl)piperazine, 1-(m-bromophenyl)piperazine, 1-(p-tolyl)piperazine, 1-(o-fluorophenyl)piperazine and 1-(m-methoxyphenyl) piperazine for the phenylpiperazine the following compounds are respectively obtained: 2-[3-(4-p-chlorophenyl-1 - piperazinyl)propyl]-3,3a,4,5-tetrahydroimidazo[1,5-a]-quinolin - 1 - (2H) - one; 2 - [3 - (4 - m - trifluoromethylphenyl - 1 - piperazinyl)propyl] - 3,3a,4,5 - tetrahydroimidazo[1,5-a] - quinolin - 1 - (2H) - one; 2 - [3 - (4 - m-bromophenyl - 1 - piperazinyl)propyl] - 3,3a,4,5-tetrahydroimidazo - [1,5-a]quinolin - 1 - (2H) - one; 2-[3-(4-p-tolyl - 1 - piperazinyl)propyl] - 3,3a,4,5 - tetrahydroimidazo[1,5-a] - quinolin - 1 - (2H) - one; 2 - [3 - (4-o-fluorophenyl - 1 - piperazinyl) - 3,3a,4,5 - tetrahydroimidazo[1,5-a]quinolin - 1 - (2H) - one; 2 - [3-(4-m-methoxyphenyl - 1 - piperazinyl)propyl] - 3,3a,4,5-tetrahydroimidazo - [1,5-a]quinolin-1-(2H)-one.

EXAMPLE 19

Preparation of 2 - [3 - (4 - phenyl - 1,2,5,6 - tetrahydro - 1 - pyridinyl) - propyl] - 3,3a,4,5 - tetrahydroimidazo-[1,5-a]quinolin-1-(2H)-ones When the procedure of Example 18 is used and the phenylpiperazine is replaced by 4-phenyl-1,2,5,6-tetrahydropyridine, 4 - (m-trifluoromethylphenyl) - 1,2,5,6 - tetrahydropyridine, 4 - (o-fluorophenyl) - 1,2,5,6 - tetrahydropyridine, 4 - (p-chlorophenyl) - 1,2,5,6-tetrahydropyridine 4 - (m-bromophenyl) - 1,2,5,6 - tetrahydropyridine, 4 - (p-tolyl) - 1,2,5,6 - tetrahydropyridine and 4 - (m-methoxyphenyl) - 1,2,5,6 - tetrahydropyridine, the following compounds are respectively obtained: 2 - [3-(4 - phenyl - 1,2,5,6 - tetrahydro - 1 - pyridinyl)propyl]-3,3a,4,5 - tetrahydroimidazo[1,5-a]quinolin - 1 - (2H) - one, 2 - [3 - (4 - m-trifluoromethylphenyl) - 1,2,5,6-tetrahydro - 1 - pyridinyl)propyl] - 3,3a,4,5 - tetrahydroimidazo[1,5-a]quinolin - 1 - (2H) - one, 2 - [3 - (4 - o - fluorophenyl - 1,2,5,6 - tetrahydro-1-pyridinyl)-propyl]- 3,3a,4,5 - tetrahydroimidazo[1,5-a]quinolin - 1 - (2H)-one, 2-[3-(4-p-chlorophenyl-1,2,5,6-tetrahydro-1-pyridinyl) propyl] - 3,3a,4,5 - tetrahydroimidazo[1,5 - a]quinolin-1(2H) - one, 2 -[3 - (4-m-bromophenyl-1,2,5,6-tetrahydro-1 - pyridinyl)propyl] - 3,3a,4,5 - tetrahydroimidazo[1,5-a]quinolin - 1 - (2H) - one, 2 - [3 - (4 - p-tolyl - 1,2,5,6-tetrahydro - 1 - pyridinyl)propyl] - 3,3a,4,5 - tetrahydroimidazo[1,5-a]quinolin - 1 - (2H) - one and 2-[3-(4-m-methoxyphenyl - 1,2,5,6 - tetrahydro - 1 - pyridinyl)propyl] - 3,3a,4,5 - tetrahydroimidazo[1,5 - a]quinolin - 1 - (2H) - one.

EXAMPLE 20

Preparation of 2 - [(1 - benzyl - 3 - pyrrolidinyl)methyl]- 3,3a,4,5 - tetrahydroimidazo[1,5-a]quinolin - 1 - (2H)-one A slurry of 5.6 parts of 3,3a,4,5-tetrahydroimidazo-[1,5-a]quinolin-1-(2H)-one in 100 parts of diglyme is added to a suspension of 1.6 parts of 50% sodium hydride (in mineral oil) in 10 parts of diglyme and the mixture is stirred until liberation of hydrogen is complete. A solution of 7 parts of 1-benzyl-3-chloromethylpyrrolidine in 20 parts of diglyme is added and the mixture is heated at reflux temperature for 4 hours and filtered hot. The filtrate is concentrated to remove the solvent. The residue is dissolved in dilute hydrochloric acid and extracted with benzene to remove impurities. The aqueous layer is made alkaline and extracted with benzene. The benzene layer is concentrated and the residue which is the desired product, is warmed with 4 parts of fumaric acid and enough ethanol to cause solution to occur which produces the fumarate salt. Ether is added until crystallization occurs. The product is filtered off and recrystallized twice from ethanol. The 2 - [1 - benzyl - 3 - pyrrolidinyl)methyl] - 3,3a,4,5 - tetrahydroimidazo[1,5-a]quinolin - 1 - (2H)-one fumarate melts at 166–168° C.

EXAMPLE 21

Preparation of 2 - [1 - p - chlorobenzyl-3-pyrrolidinyl)-ethyl] - 3,3a,4,5 - tetrahydroimidazo[1,5-a]quinolin-1-(2H)-one The above compound is obtained when 2-(1-p-chlorobenzyl - 3 - pyrrolidinyl)ethyl chloride is substituted for 1 - benzyl - 3 - chloromethylpyrrolidine in the procedure of Example 20.

EXAMPLE 22

Preparation of 2 - [(1 - m - bromobenzyl - 3 - pyrrolidinyl)methyl] - 3,3a,4,5 - tetrahydroimidazo[1,5-a]-quinolin - 1 - (2H) - one When 1 - (m-bromobenzyl) - 3 - chloromethylpyrrolidine is substituted for 1 - benzyl - 3 - chloromethylpyrrolidine in the procedure of Example 20, this compound is obtained.

EXAMPLE 23

Preparation of 2 - [(1 - benzyl - 3 - piperidinyl)methyl]- 3,3a,4,5 - tetrahydroimidazo[1,5-a]quinolin - 1 - (2H)-one If 1 - benzyl - 3 - chloromethylpiperidine is substituted for 1 - benzyl - 3 - chloromethylpyrrolidine in the procedure of Example 20, the above compound is obtained.

EXAMPLE 24

Preparation of 2 - [(1 - benzyl - 2 - pyrrolidinyl)ethyl]- 3,3a,4,5 - tetrahydroimidazo[1,5 - a]quinolin-1-(2H)-one This compound is obtained when 2 - (1 - benzyl - 2 - pyrrolidinyl)ethyl chloride is substituted for 1 - benzyl - 3 - chloromethylpyrrolidine in the procedure of Example 20.

EXAMPLE 25

Preparation of 2 - [(1 - methyl - 3 - pyrrolidinyl)methyl]- 3,3a,4,5 - tetrahydroimidazo[1,5-a]quinolin - 1 - (2H)-one When 3 - chloromethyl - 1 - methylpyrrolidine is substituted for 1 - benzyl - 3 - chloromethylpyrrolidine in the procedure of Example 20, this compound is obtained. The fumarate salt melts at 176–178° C.

EXAMPLE 26

Preparation of 2 - [2 - (allylmethylamino)ethyl] - 3,3a,4,5 - tetrahydroimidazo[1,5-a]quinolin - 1 - (2H)-one This compound is obtained when 2 - allylmethylaminoethyl chloride is substituted for 2 - (1 - pyrrolidinyl)-ethyl chloride in the procedure of Example 1.

EXAMPLE 27

Preparation of 2 - [2 - (N - Cyclopropylmethyl - N - methylamino)ethyl] - 3,3a,4,5 - tetrahydroimidazo-[1,5-a]quinolin-1-(2H)-one When 2 - (N-cyclopropylmethyl-N-methylamino)ethyl chloride is substituted for 2-(1-pyrrolidinyl)ethyl chloride in the procedure of Example 1, this compound is obtained.

EXAMPLE 28

Preparation of 2-[2-(1-methyl-4-piperazinyl)ethyl]-3,3a,4,5-tetrahydroimidazol[1,5-a]quinolin-1-(2H)-one If 2-(1-pyrrolidinyl)ethyl chloride is replaced by 2-(1-methyl-4-piperazinyl)ethyl chloride in the procedure of Example 1, the above compound is obtained.

EXAMPLE 29

Preparation of 2-(2-benzylmethylaminoethyl)-3,3a,4,5-tetrahydroimidazol[1,5-a]quinolin-1-(2H)-one The above compound is obtained when 2-benzylmethylaminoethyl chloride is substituted for 2-(1-pyrrolidinyl)-ethyl chloride in the procedure of Example 1. The hydrochloride salt melts at 198–200° C.

EXAMPLE 30

Preparation of 2-[3-(1-piperazinyl)propyl]-3,3a,4,5-tetrahydroimidazo[1,5-a]quinolin-1-(2H)-one When piperazine is substituted for 1-phenylpiperazine in the procedure of Example 18, this compound is obtained.

EXAMPLE 31

Preparation of 2-(2-methylaminoethyl)-3,3a,4,5-tetrahydroimidazo[1,5-a]quinolin-1-(2H)-one hydrochloride A mixture of 5 parts of 2-(2-benzylmethylaminoethyl)-3,3a,4,5-tetrahydroimidazo[1,5-a]quinolin - 1 - (2H)-one hydrochloride (Example 29), 200 parts of 90% ethanol and 1.0 part of 10% palladium-on-carbon catalyst is shaken in a Parr hydrogenator under about 3 atmospheres of hydrogen pressure until hydrogen uptake is complete. The catalyst is filtered off, the solvent is distilled off and the 2 - (2-methylaminoethyl)-3,3a,4,5-tetrahydroimidazo-[1,5-a]quinolin-1-(2H)-one hydrochloride, is thus obtained.

EXAMPLE 32

Preparation of 2-[(1-m-methylbenzyl - 3 - piperidinyl)-methyl] - 3,3a,4,5 - tetrahydroimidazo[1,5-a]quinolin-1-(2H)-one The above compound is obtained when 1-(m-methylbenzyl)-3-chloromethylpiperidine is substituted for 1-benzyl-3-chloromethylpyrrolidine in the procedure of Example 20.

EXAMPLE 33

Preparation of 2-[(1-p-methoxybenzyl - 2 - piperidinyl)methyl] - 3,3a,4,5 - tetrahydroimidazo[1,5-a]quinolin-1-(2H)-one When 1-benzyl-3-chloromethylpyrrolidine is replaced by 1-(p-methoxybenzyl) - 2 - chloromethylpiperidine in the procedure of Example 20, the above compound is obtained.

EXAMPLE 34

Preparation of 2-[1-p-fluorobenzyl-2-piperidinyl)methyl]-3,3a,4,5-tetrahydroimidazo[1,5 - a]quinolin - 1 - (2H)-one The above compound is obtained when 1-benzyl-3-chloro-methylpyrrolidine is replaced by 1-(p-fluorobenzyl)-2-chloromethylpiperidine in the procedure of Example 20.

EXAMPLE 35

Preparation of 2-[(1-p-chlorobenzyl - 3 - piperidinyl)-methyl]-3,3a,4,5-tetrahydroimidazo[1,5-a]quinolin - 1-(2H)-one If 1-benzyl-3-chloromethylpyrrolidine is replaced by 1-(p-chlorobenzyl)-3-chloromethylpiperidine in the procedure of Example 20, the above compound is obtained.

EXAMPLE 36

Preparation of 2-[(1-m-bromobenzyl - 2 - piperidinyl)-methyl]-3,3a,4,5-tetrahydroimidazo[1,5-a]quinolin - 1-(2H)-one When 1-(m-bromobenzyl)-2-chloromethylpiperidine is substituted for 1-benzyl-3-chloromethylpyrrolidine in the procedure of Example 20, this compound is prepared.

EXAMPLE 37

Preparation of 5,7-dimethyl-2-(2-dimethylaminoethyl)-3,3a,4,5-tetrahydroimidazo[1,5-a]quinolin-1-(2H)-one This compound is obtained when 5,7-dimethyl-3,3a,4,5-tetrahydroimidazo[1,5 - a]quinolin-1-(2H)-one is reacted with 2-dimethylaminoethyl chloride by the procedure of Example 1.

EXAMPLE 38

Preparation of 5,8-dichloro-2-(2-dimethylaminoethyl)-3,3a,5,6-tetrahydroimidazo[1,5-a]quinolin-1-(2H)-one If 5,8-dichloro - 3,3a,4,5 - tetrahydroimidazo[1,5-a]-quinolin-1-(2H)-one is reacted with 2 - dimethylaminoethyl chloride by the procedure of Example 1, this compound is obtained.

EXAMPLE 39

Preparation of 2 - [2 - (N - cyclohexyl-N-methylamino)-ethyl]-3,3a,4,5-tetrahydroimidazo[1,5 - a]quinolin - 1-(2H)-one The above compound is obtained when 2-(N-cyclohexyl-N-methylamino)ethyl chloride is substituted for 2-(1-pyrrolidinyl)ethyl chloride in the procedure of Example 1.

EXAMPLE 40

Preparation of 2-[3-(4 - acetoxyethyl-1-piperazinyl)propyl]-3,3a,4,5 - tetrahydroimidazo[1,5-a]quinolin - 1-(2H)-one This compound is obtained when the 1-phenylpiperazine is replaced by 1-(acetoxyethyl)piperazine in the procedure of Example 18.

EXAMPLE 41

Preparation of 2-[3 - (4-hydroxyethyl-1-piperazinyl)propyl]-3,3a,4,5 - tetrahydroimidazo[1,5-a]quinolin - 1-(2H)-one When 1-(hydroxyethyl)piperazine is used in place of 1-phenylpiperazine in the procedure of Example 18, this compound is obtained.

EXAMPLE 42

Preparation of 2 - [(1-p-methoxyphenyl-3-pyrrolidinyl)-methyl]-3,3a,4,5-tetrahydroimidazo[1,5-a]quinolin - 1-(2H)-one The above compound is obtained when 1-(p-methoxybenzyl)-3-chloromethylpyrrolidine is substituted for 1 benzyl-3-chloromethylpyrrolidine in the procedure of Example 20.

EXAMPLE 43

Preparation of 2-[(1-p-fluorobenzyl - 2 - pyrrolidinyl)-methyl]-3,3a,4,5-tetrahydroimidazo[1,5-a]quinolin - 1-(2H)-one This compound is obtained when 1-(p-fluorobenzyl)-2-chloromethylpyrrolidine is substituted for 1-benzyl-3-chloromethylpyrrolidine in the procedure of Example 20.

EXAMPLE 44

Preparation of 2-[(1-benzyl-3-pyrrolidinyl)methyl] - 8 chloro-3,3a,4,5-tetrahydroimidazo[1,5-a]quinolin - 1-(2H)-one When 8-chloro - 3,3a,4,5 - tetrahydroimidazo[1,5-a]-quinolin-1-(2H)-one is substituted for 3,3a,4,5-tetrahydroimidazo[1,5-a]quinolin-1-(2H)-one in the procedure of Example 20, this compound is obtained.

EXAMPLE 45

Preparation of 2-[(1-benzyl-3-pyrrolidinyl)methyl] - 7-bromo-3,3a,4,5 - tetrahydroimidazo[1,5-a]quinolin - 1-(2H)-one If the 3,3a,4,5-tetrahydroimidazo[1,5-a]quinolin - 1-(2H)-one is replaced by 7-bromo-3,3a,4,5-tetrahydroimidazo[1,5-a]quinolin-1-(2H)-one in the procedure of Example 20, this compound is obtained.

EXAMPLE 46

Preparation of 2-[2-(1-pyrrolidinyl)ethyl]-3,3a,4,5-tetrahydroimidazo[1,5-a]quinolin-1-(2H)-thione A mixture of 10 parts of 2-[2-(1-pyrrolidinyl)ethyl]-3,3a,4,5 - tetrahydroimidazo[1,5 - a]quinolin - 1 - (2H)-one, 100 parts of xylene, and 10 parts of phosphorus pentasulfide is heated with stirring in an oil bath at 155–160° C. for 48 hours. The reaction mixture is cooled and 175 ml. of 2 N sodium hydroxide and 200 ml. of benzene are added. The mixture is stirred until the glassy layer is dissolved and the layers are separated. The aqueous layer is extracted with benzene. The organic layers are combined, washed with water, dried over magnesium sulfate and concentrated to remove solvent. The residue contains 2-[2-(1-pyrrolidinyl)ethyl]-,3a,4,5-tetrahydroimidazo[1,5-a]quinolin-1-(2H)-thione and is further purified by partition chromatography.

EXAMPLE 47

Preparation of 2-(4-phenyl-1-piperazinylmethyl)-3,3a,4,5-tetrahydroimidazo[1,5-a]quinolin-1-(2H)-one A mixture of 1.86 parts of 3,3a,4,5-tetrahydroimidazo [1,5-a]quinolin-1- 2H)-one, 1.62 parts of 1-phenyl-piperazine, 30 parts of ethanol and 0.8 part of 37% formaldehyde is heated at reflux temperature for 90 minutes and concentrated. The residue is triturated with ether and the insoluble portion, 0.2 part, is filtered off and discarded. The mother liquor is concentrated to remove the ether, and the residue is dissolved in benzene. This solution is again concentrated. The glassy residue is triturated with ether and crystallization occurs. The 2-(4 - phenyl - 1 - piperazinylmethyl) - 3,3a,4,5 - tetrahydroimidazo[1,5-a]quinolin-1-(2H)-one is filtered off and melts at 111–113° C.

EXAMPLE 48

Preparation of 7-chloro-2-[2-(1-pyrrolidinyl)ethyl]3,3a, 4,5-tetrahydroimidazo[1,5-a]quinolin-1-(2H)-one The above compound is obtained when 7-chloro-3,3a, 4,5-tetrahydroimidazo[1,5-a]quinolin-1-(2H)-one is substituted for 3,3a,4,5-tetrahydroimidazo[1,5-a]quinolin-1-(2H)-one in the procedure of Example 1. The hydrochloride salt melts at 237–239° C.

EXAMPLE 49

Preparation of 7-methoxy-2-[2-(1-pyrrolidinyl)ethyl]-3, 3a,4,5-tetrahydroimidazo[1,5-a]quinolin-1-(2H)-one When 7-methoxy-3,3a,4,5-tetrahydroimidazo[1,5-a]quinolin-1-(2H)-one is substituted for 3,3a,4,5-tetrahydroimidazo[1,5-a]quinolin-1-(2H)-one in the procedure of Example 1, this compound is obtained. The hydrochloride salt melts at 232–234° C.

EXAMPLE 50

Preparation of 8-methyl-2-[2-(1-pyrrolidinyl)ethyl]-3,3a, 4,5-tetrahydroimidazo[1,5-a]quinolin-1-(2H)-one If 3,3a,4,5 - tetrahydroimidazo[1,5-a]quinolin-1-(2H)-one is replaced by 8-methyl-3,3a,4,5-tetrahydroimidazo [1,5-a]quinolin-1-(2H)-one in the procedure of Example 1, the above compound is obtained. The fumarate salt melts at 175–177° C.

EXAMPLE 51

Preparation of 7,9-dichloro-2-[2-(1-pyrrolidinyl)ethyl]-3, 3a,4,5-tetrahydroimidazo[1,5-a]quinolin-1-(2H)-one This compound is obtained when 7,9-dichloro-3,3a,4,5-tetrahydroimidazo[1,5-a]quinolin-1-(2H)-one is substituted for 3,3a,4,5 - tetrahydroimidazo[1,5-a]quinolin-1-(2H)-one in the procedure of Example 1. The hydrochloride salt melts at 266–268° C.

EXAMPLE 52

Preparation of 7-chloro-8-methyl-2-[2-(1-pyrrolidinyl) ethyl] - 3,3a,4,5 - tetrahydroimidazo[1,5 - a]quinolin-1-(2H)-one When 7-chloro-8-methyl-3,3a,4,5-tetrahydroimidazo[1, 5-a]quinolin-1-(2H)-one is substituted for 3,3a,4,5-tetrahydroimidazo[1,5-a]quinolin-1-(2H)-one in the procedure of Example 1, the above compound is obtained. The hydrochloride salt melts at 268–270° C.

EXAMPLE 53

Preparation of 7 - bromo-8-methyl-2-[2-(1-pyrrolidinyl) ethyl] - 3,3a,4,5 - tetrahydroimidazo[1,5 - a]quinolin-1-(2H)-one This compound is obtained when 7-bromo-8-methyl-3, 3a,4,5 - tetrahydroimidazo[1,5 - a]quinolin-1-(2H)-one is substituted for 3,3a,4,5-tetrahydroimidazo[1,5-a]quinolin-1-(2H)-one in the procedure of Example 1. The hydrochloride salt melts at 276–278° C.

EXAMPLE 54

Preparation of 8-chloro-2-(2-ethylmethylaminoethyl)-3, 3a,4,5-tetrahydroimidazo[1,5-a]quinolin-1-(2H)-one When 8-chloro-3,3a,4,5-tetrahydroimidazo[1,5-a]quinolin-1-(2H)-one is treated with 2-(ethylmethylamino)ethyl chloride by the procedure of Example 1, the above compound is obtained. The hydrochloride salt melts at 165–167° C.

EXAMPLE 55

Preparation of 2 - (2 - ethylmethylaminoethyl)-3,3a,4,5-tetrahydroimidazo[1,5-a]quinolin-1-(2H)-one The above compound is obtained when 2-ethylmethylamino)-ethyl chloride is substituted for 2-(1-pyyrolidinyl) ethyl chloride in the procedure of Example 1. The hydrochloride melts at 181–183° C.

EXAMPLE 56

Preparation of 2-(2-ethylmethylaminoethyl)-8-methyl-3, 3a,4,5-tetrahydroimidazo[1,5-a]quinolin-1-(2H)-one When 2-(2-ethylmethylamino)ethyl chloride is reacted with 8-methyl-3,3a,4,5-tetrahydroimidazo[1,5-a]quinolin-1-(2H)-one by the procedure of Example 1, the above compound is obtained. The hydrochloride salt melts at 175–177° C.

EXAMPLE 57

Preparation of 2-(2-ethylmethylaminoethyl)-7-methoxy-3,3a,4,5-tetrahydroimidazo[1,5-a]quinolin-1-(2H)-one The above compound is obtained when a 7-methoxy-3,3a,4,5-tetrahydroimidazo[1,5-a]quinolin-1-(2H)-one is treated with 2-(2-ethylmethylamino)ethyl chloride by the procedure of Example 1. The hydrochloride melts at 187–189° C.

EXAMPLE 58

Preparation of 8-chloro-2-(2-diethylaminoethyl)-3,3a,4,5-tetrahydroimidazol[1,5-a]quinolin-1-(2H)-one If 2-diethylaminoethyl chloride is contacted with 8-chloro - 3,3a,4,5 - tetrahydroimidazo[1,5 - a]quinolin - 1-(2H)-one by the procedure of Example 1, the above compound is obtained. The hydrochloride melts at 157–159° C.

EXAMPLE 59

Preparation of 2-(2-benzylmethylaminoethyl)-7-chloro-3,3a,4,5-tetrahydroimidazo[1,5-a]quinolin-1-(2H)-one This compound is obtained when 2-benzylmethylaminoethyl chloride is treated with 7-chloro-3,3a,4,5-tetrahydroimidazo[1,5-a]quinolin-1-(2H)-one by the procedure of Example 1. The hydrochloride melts at 218–220° C.

EXAMPLE 60

Preparation of 2-(2-benzylmethylaminoethyl)-8-methyl-3,3a,4,5-tetrahydroimidazo[1,5-a]quinolin-1-(2H)-one When 8-methyl-3,3a,4,5-tetrahydroimidazo[1,5-a]quinolin-1-(2H)-one is treated with 2-benzylmethylaminoethyl chloride, by the procedure of Example 1, the above compound is obtained. The hydrochloride melts at 205–207° C.

I claim:
1. An imidazo[1,5-a]quinoline of the formula:

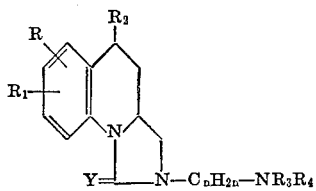

wherein R is selected from the group consisting of hydrogen, halogen, lower alkyl, lower alkoxy and trifluoromethyl; $R_1$ is selected from the group consisting of hydrogen and halogen; $R_2$ is selected from the group consisting of hydrogen and lower alkyl; Y is selected from the group consisting of oxygen and sulfur; $n$ is an integer from 1 to 4 and $R_3$ and $R_4$ are selected from the group consisting of hydrogen, lower alkyl, lower alkenyl, cycloalkyl, aralkyl, lower(cycloalkyl)methyl, and when —$NR_3R_4$ is taken together 1-pyrrolidinyl, lower alkyl-1-pyrrolidinyl, piperidino, lower alkylpiperidino, morpholino, lower alkylmorpholino, hexamethyleneimino, 1-piperazinyl, 1-(loweralkyl)-4-piperazinyl, 1-(hydroxy lower alkyl)-4-piperazinyl, 1-(lower alkanoyloxyalkyl)-4-piperazinyl, 1-phenyl-4-piperazinyl, 1-(lower alkoxyphenyl)-4-piperazinyl, 1-trifluoromethylphenyl-4-piperazinyl, 1-(lower alkylphenyl)-4-piperazinyl, 1-halophenyl-4-piperazinyl, 4-phenyl-1,2,5,6-tetrahydro-1-pyridinyl, 4-alkylphenyl-1,2,5,6-tetrahydro-1-pyridinyl, 4-halophenyl-1,2,5,6-tetrahydro-1-pyridinyl, 4-lower alkoxyphenyl-1,2,5,6-tetrahydro-1-pyridinyl, 4-trifluoromethylphenyl-1,2,5,6-tetrahydro-1-pyridinyl and azabicyclo[3.2.2]nonan-3-yl); and when —$C_nH_{2n}NR_3R_4$ is taken together are (2-pyrrolidinyl)lower alkyl, (3-pyrrolidinyl)lower alkyl, (1-lower alkylpyrrolidinyl)lower alkyl, (1-benzylpyrrolidinyl)lower alkyl, [1-(halobenzyl)pyrrolidinyl]-lower alkyl, [1-(lower alkoxybenzyl)pyrrolidinyl]lower alkyl, 1-(lower alkylbenzyl)pyrrolidinyl]lower alkyl, (piperidinyl)lower alkyl, (1-lower alkylpiperidinyl)lower alkyl, (1-benzylpiperidinyl)lower alkyl, [1-(halobenzyl)piperidinyl]lower alkyl, [1-(lower alkoxybenzyl)piperidinyl]lower alkyl, [1-(lower alkylbenzyl)piperidinyl]lower alkyl; and pharmaceutically acceptable acid addition salts thereof.

2. The imidazo[1,5-a]quinoline according to claim 1: 8-chloro-2-[2-(1-pyrrolidinyl)ethyl]-3,3a,4,5 - tetrahydroimidazo[1,5-a]quinolin-1-(2H)-one.

3. The imidazo[1,5-a]quinoline according to claim 1: 7-methoxy-2-[2-(1-pyrrolidinyl)ethyl] - 3,3a,4,5-tetrahydroimidazo[1,5-a]quinolin-1-(2H)-one.

4. The imidazo[1,5-a]quinoline according to claim 1: 8-methyl-2-[2-(1-pyrrolidinyl)ethyl]-3,3a,4,5 - tetrahydroimidazo[1,5-a]quinolin-1-(2H)-one.

5. The imidazo[1,5-a]quinoline according to claim 1: 8-chloro-2-(2-ethylmethylaminoethyl)-3,3a,4,5 - tetrahydroimidazo[1,5-a]quinolin-1-(2H)-one.

6. The imidazo[1,5-a]quinoline according to claim 1: 2-(2-ethylmethylaminoethyl)-8-methyl - 3,3a,4,5-tetrahydroimidazo[1,5-a]quinolin-1-(2H)-one.

7. The imidazo[1,5-a]quinoline according to claim 1: 2-(2-ethylmethylaminoethyl)-7-methoxy - 3,3a,4,5 - tetrahydroimidazo[1,5-a]quinolin-1-(2H)-one.

8. The imidazo[1,5-a]quinoline according to claim 1: 8-chloro-2-(2 - diethylaminoethyl) - 3,3a,4,5 - tetrahydroimidazo[1,4-5]quinolin-1-(2H)-one.

9. The imidazo[1,5-a]quinoline according to claim 1: 2-(2-benzylmethylaminoethyl)-8-methyl-3,3a,4,5 - tetrahydroimidazo[1,5-a]quinolin-1-(2H)-one.

10. An imidazo[1,5-a]quinoline of the formula:

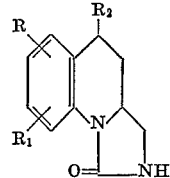

wherein R is selected from the group consisting of hydrogen, halogen, lower alkyl, lower alkoxy and trifluoromethly; $R_1$ is selected from the group consisting of hydrogen and halogen, one of R and $R_1$ being other than hydrogen and $R_2$ is selected from the group consisting of hydrogen and lower alkyl.

References Cited

UNITED STATES PATENTS

| | | | |
|---|---|---|---|
| 3,004,975 | 10/1961 | Grob | 260—268 X |
| 3,151,116 | 9/1964 | De Stevens | 260—268 |
| 3,200,123 | 8/1965 | Richardson | 260—288 |
| 3,354,164 | 11/1967 | Francis | 260—288 |
| 2,865,749 | 12/1958 | Van Allan | 260—288 X |
| 2,887,378 | 5/1959 | Williams | 96—67 |

OTHER REFERENCES

Burgstahler et al., Tetrahedron Letters No. 1, pp. 61–4 (1964).

ALEX MAZEL, *Primary Examiner.*

D. A. DAUS, *Assistant Examiner.*

U.S. Cl. X.R.

260—268, 286, 287, 309, 544, 326.8, 293, 247, 247.1, 247.2, 239, 652, 290, 583, 287; 424—258, 250, 244